United States Patent Office 2,957,870
Patented Oct. 25, 1960

2,957,870

PHENOTHIAZINEALKYLPIPERIDINE-CARBOXAMIDES

John W. Cusic, Skokie, and Henry William Sause, Deerfield, Ill., assignors to G. D. Searle & Co., Chicago, Ill., a corporation of Delaware No Drawing. Filed Nov. 5, 1957, Ser. No. 694,517

13 Claims. (Cl. 260—243)

The present invention relates to a new group of piperidinecarboxamide derivatives and more particularly to phenothiazinealkylpiperidinecarboxamides of the general structural formula

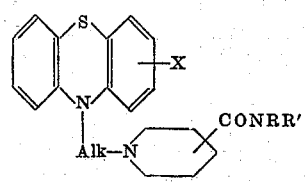

and the pharmaceutically acceptable nontoxic salts thereof, wherein Alk is a lower alkylene radical, X is either hydrogen or a halogen radical, and NRR' is a member of the class consisting of amino radicals, lower alkyl amino radicals, lower alkenyl amino radicals, lower dialkylamino radicals, lower dialkenylamino radicals and lower hydroxyalkyl amino radicals.

In the foregoing structural formula Alk represents a lower alkylene radical such as methylene, ethylene, propylene, trimethylene, tetramethylene, pentamethylene, and hexamethylene.

Among the radicals which R and R' can represent are such lower alkyl groups as methyl, ethyl, propyl, butyl, pentyl and hexyl, wherein the propyl, butyl, pentyl, and hexyl groups may be either of the straight-chain or branch-chain type. The radicals R and R' can also represent a lower alkenyl radical such as vinyl, propenyl, allyl, methallyl, crotyl and the like.

The piperidinecarboxamides depicted above form pharmaceutically acceptable salts with a variety of inorganic and strong organic acids including sulfuric, phosphoric, hydrochloric, hydrobromic, succinic, malic, citric, maleic, ascorbic, sulfamic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

The compounds of this invention provide anti-emetic agents of an unusually high degree of potency, but unlike certain somewhat related 2-chlorophenothiazine derivatives, they do not possess tranquilizing activity except in a much higher order of dosage. The compounds of this invention are particularly useful in the prevention of post-anesthetic and post-operative nausea in patients in which ataraxia is not desirable. These compounds are also valuable agents for overcoming the hypertension produced by the mineralocorticoid hormone desoxycorticosterone and are anti-inflammatory agents.

The compounds of this invention can readily be prepared by the condensation of a compound of the structural formula

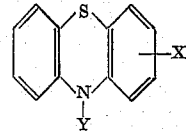

with at least one equivalent of a compound of the structural formula

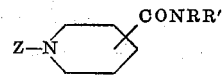

where one of the groups Y and Z is hydrogen and the other is a Halogen-Alk group, where X is hydrogen or a halogen radical, and where NRR' and Alk are defined as hereinabove in the presence of at least one additional equivalent of base. It is an obvious alternative to those skilled in the art that a compound of the structural formula

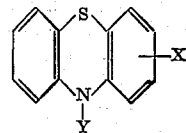

can be condensed with at least one equivalent of a compound of the structural formula

where X, Y, and Z are defined as hereinabove, and A is a member of the class consisting of lower alkoxy radicals such as methoxy, ethoxy, propoxy, and the like in the presence of one additional equivalent of base to give a compound of the structural formula

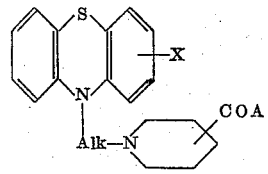

where Alk, X, and A are defined as hereinabove, and the subsequent contacting of the foregoing compound with ammonia or an amine of the type HNRR', where NRR' is defined as hereinabove, to give a compound of the structural formula

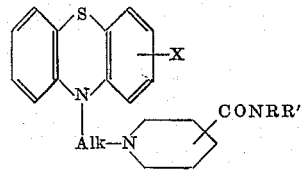

where X, Alk and NRR' are defined as hereinabove.

The examples given below illustrate in detail some of the compounds which comprise this invention and methods for their production. It will be apparent to those skilled in the art that numerous modifications in materials and methods can be adopted without departing from the invention. In these examples quantities of materials are given in parts by weight and pressures in millimeters (mm.) of mercury.

The present application is a continuation-in-part of the copending application Serial No. 622,283, filed November 15, 1956, now abandoned.

*Example 1*

To a stirred and refluxing suspension of 4.95 parts of 4-piperidinecarboxamide, 1 part of sodium iodide and 8.4 parts of potassium carbonate in 40 parts of butanone there are added in the course of 30 minutes 9.3 parts of 2-chloro-10-(γ-chloropropyl)phenothiazine in 40 parts of butanone. Stirring and refluxing are continued for 12 hours after which the mixture is cooled and filtered. The filtrate is concentrated under vacuum to give a residue which is recrystallized from a mixture of 2-propanol and petroleum ether. The 1-[γ-(2'-chloro-10'-phenothiazine)propyl]piperidine-4-carboxamide thus obtained melts at approximately 139° C.

This base is dissolved in a small amount of 2-propanol and treated with a 25% solution of hydrogen chloride in 2-propanol. Upon treatment of this solution with anhydrous ether a hydrochloride precipitates as a white solid melting at about 196°–197° C. with formation of bubbles.

Example 2

To a stirred and refluxing suspension of 4.95 parts of 3-piperidinecarboxamide hydrochloride, 1 part of sodium iodide and 8.4 parts of potassium carbonate in 40 parts of ethanol there is added in the course of a half hour a solution of 9.3 parts of 2-chloro-10-(γ-chloropropyl)-phenothiazine in 40 parts of butanone. Stirring and refluxing are continued for 12 hours after which the mixture is cooled and filtered. The filtrate is concentrated under vacuum and the residue is taken up in benzene and sodium carbonate. The benzene solution is washed to neutrality with water, filtered through potassium carbonate, treated with hydrochloric acid in 2-propanol, and diluted with ether. The precipitated hydrochloride is collected on a filter, washed with ether, and dissolved in water. This solution is rendered alkaline by addition of 5% sodium carbonate and extracted with benzene. The benzene solution is washed to neutrality, filtered through potassium carbonate and evaporated to yield 1 - [γ - (2' - chloro - 10' - phenothiazine)propyl]piperidine-3-carboxamide. This compound can be further purified by repeatedly taking up in ether, washing with water, filtration through potassium carbonate, treatment with hydrochloric acid, dilution with ether, decantation of the organic layer, solution of the hydrochloride in water, alkalinization, extraction of the base with benzene, washing of the benzene solution to neutrality with water, filtration through potassium carbonate, treatment with charcoal and evaporation. The base thus obtained consists of a light yellow material which melts unsharply at about 65°–68° C. after softening at about 55° C.

Example 3

A suspension of 9.9 parts of 2-piperidinecarboxamide hydrochloride, 2 parts of sodium iodide and 16.8 parts of potassium carbonate in 80 parts of butanone is stirred and heated to reflux and then treated in the course of 20 minutes with a solution of 18.6 parts of 2-chloro-10-(γ-chloropropyl)phenothiazine in 80 parts of butanone. Stirring and refluxing are continued for 10 hours after which the mixture is cooled and filtered and the filtrate is evaporated. The residual base is submitted to short-path distillation at about 0.01 mm. pressure and a furnace temperature of about 245° C. There is thus obtained 1-[γ-(2'-chloro-10'-phenothiazine)propyl]piperidine-2-carboxamide. The compound melts at about 168° C.–170° C.

If in the foregoing procedure 17.7 parts of 3-chloro-10-(β-chloroethyl)phenothiazine are used in lieu of the 2-chloro-10-(γ-chloropropyl)phenothiazine there is obtained 1-[β(3'-chloro-10'-phenothiazine)ethyl]piperidine-2-carboxamide which can be purified by short-path distillation at about 0.01 mm. pressure on heating of the jacket to approximately 230° C.

Example 4

To a refluxing, turbinated mixture of 16.5 parts of 4-piperidinecarboxamide, 3.3 parts of sodium iodide, 28 parts of potassium carbonate and 150 parts of butanone there are added in the course of 20 minutes 27.5 parts of 10-(γ-chloropropyl)phenothiazine in 150 parts of butanone. Agitation and refluxing are continued for 5 hours after which the mixture is cooled and filtered. The filtrate is concentrated under vacuum and the residue is dissolved in a small amount of 2-propanol and treated with a 25% solution of hydrogen chloride in 2-propanol. Upon trituration with ether there precipitates the hydrochloride of 1-[γ-(10'-phenothiazine)propyl]piperidine-4-carboxamide in white prisms. The free base melts at about 153° C.–154° C.

Example 5

An agitated and refluxing suspension of 33 parts of 3-piperidinecarboxamide, 6.7 parts of sodium iodide and 56 parts of potassium carbonate in 300 parts of butanone is treated by gradual addition with 58.9 parts of 10-(γ-chloropropyl)phenothiazine in 250 parts of butanone. Agitation and refluxing are continued for 6 hours. The mixture is then cooled and filtered. The filtrate is concentrated under vacuum and the residue is submitted to short-path distillation at about 0.01 mm. pressure and about 210° C. furnace temperature to yield 1-[γ-10'-phenothiazine)propyl]piperidine-3-carboxamide.

Substitution of 59.7 parts of 10-(δ-chlorobutyl)phenothiazine for the (γ-chloropropyl) derivative used above yields 1-[δ-(10'-phenothiazine)butyl]piperidine-3-carboxamide which can be purified by short-path distillation at about 0.01 mm. pressure and a furnace temperature of about 220° C.

Example 6

To a stirred and refluxing suspension of 4.95 parts of 4-piperidinecarboxamide hydrochloride, 1 part of sodium iodide and 8.4 parts of potassium carbonate in 40 parts of butanone there are added, in the course of 30 minutes, 10.4 parts of 2-bromo-10-(β-chloroethyl)phenothiazine in 40 parts of butanone. Stirring and refluxing are continued for 12 hours after which the mixture is cooled and filtered. The filtrate is concentrated under vacuum to give a residue which is recrystallized from a mixture of 2-propanol and petroleum ether. The base can be dissolved in a small amount of 2-propanol and treated with a 25% solution of hydrogen chloride in 2-propanol to yield the hydrochloride of 1-[β-(2'-bromo-10'-phenothiazine)ethyl]piperidine-4-carboxamide.

Example 7

To a stirred and refluxing suspension of 5.4 parts of 4-(N-β-hydroxyethyl)piperidinecarboxamide hydrochloride, 1 part of sodium iodide, and 8.4 parts of potassium carbonate in 40 parts of butanone there are added in the course of 30 minutes, 9.3 parts of 2-chloro-10-(γ-chloropropyl)phenothiazine in 40 parts of butanone. Stirring and refluxing are continued for 12 hours after which the mixture is cooled and filtered. The filtrate is concentrated under vacuum to give a residue which is recrystallized from a mixture of 2-propanol and petroleum ether.

This base is dissolved in a small amount of 2-propanol and treated with a 25% solution of hydrogen chloride in 2-propanol. Upon treatment of the solution with anhydrous ether there is obtained the hydrochloride of 1-[γ - (2' - chloro - 10' - phenothiazine)propyl]piperidine-4-(N-β-hydroxyethyl)carboxamide melting at approximately 120° C. with decomposition after softening at approximately 106° C.

Example 8

To a stirred and refluxing suspension of 5.8 parts of 4-(N-γ-hydroxypropyl)piperidinecarboxamide hydrochloride, 1 part of sodium iodide and 8.4 parts of potassium carbonate in 40 parts of ethanol there is added in the course of half an hour a solution of 8.0 parts of 2-chloro-10-(β-chloroethyl)phenothiazine in 40 parts of butanone. The 4-(N-γ-hydroxypropyl)piperidinecarboxamide is prepared by methods analogous to the preparation of 4-(N-β-hydroxyethyl)piperidinecarboxamide. Stirring and refluxing are continued for 12 hours after which the mixture is cooled and filtered. The filtrate is concentrated under vacuum and the residue is recrystallized from a mixture of 2-propanol and petroleum ether. The base can be dissolved in a small amount of 2-propanol and treated with a 25% solution of hydrogen chloride in 2-propanol to yield the hydrochloride of 1-[β-(2'-chloro-10'-phenothiazine)ethyl]piperidine - 4 - (N - γ-hydroxypropyl)carboxamide.

*Example 9*

To a stirred and refluxing suspension of 5.0 parts of 4-(N-methyl)piperidinecarboxamide hydrochloride, 1 part of sodium iodide and 8.4 parts of potassium carbonate in 40 parts of butanone there are added in the course of 30 minutes 9.3 parts of 2-chloro-10-(γ-chloropropyl)phenothiazine in 40 parts of butanone. Stirring and refluxing are continued for 12 hours after which the mixture is cooled and filtered. The filtrate is concentrated under vacuum and the residue is taken up in benzene and sodium carbonate. The benzene solution is washed to neutrality with water, filtered through potassium carbonate, treated with hydrochloric acid in 2-propanol, and diluted with ether. The precipitated hydrochloride is collected on a filter, washed with ether, and dissolved in water. This solution is rendered alkaline by addition of a 5% sodium carbonate solution and extracted with benzene. The benzene solution is washed to neutrality, filtered through potassium carbonate, and evaporated to yield 1-[γ-(2'-chloro-10'-phenothiazine)propyl]-piperidine-4-(N-methyl)carboxamide.

This base is dissolved in a small amount of 2-propanol and treated with a 25% solution of hydrogen chloride in 2-propanol. Upon treatment of this solution with anhydrous ether there is obtained the hydrochloride of 1 - [γ - (2' - chloro - 10' - phenothiazine)propyl]piperidine-4-(N-methyl)carboxamide which shrinks at approximately 230° C.–240° C., softens at approximately 240° C.–244° C., and melts with decomposition at about 245° C.–248 C.

The isomeric 1 - [γ - (2' - chloro-10'-phenothiazine)-propyl]piperidine-2-(N-methyl)carboxamide is made by an analogous process and melts at about 124° C.–128° C. with evolution of gas.

*Example 10*

A mixture of 25 parts of methyl isonicotinate and 25 parts of dimethyl amine is heated in a bomb at 120° C. for 7 hours. The residue is taken up in methanol. The methanolic solution is evaporated to dryness to yield 4-(N,N-dimethyl)pyridinecarboxamide as an extremely hydroscopic solid.

About 15 parts of the pyridinecarboxamide of the preceding paragraph is dissolved in 100 parts of water. Fifteen parts of a 25% solution of hydrogen chloride in 2-propanol are added and the mixture is hydrogenated over a platinum oxide catalyst. The solution is filtered and shaken with a small amount of silver oxide to destroy the hydrochloric acid. The mixture is filtered and evaporated to dryness to yield 4-(N,N-dimethyl)piperidinecarboxamide. This compound is also extremely hydroscopic and is used directly in the preparation of 1 - [γ - (2' - chloro - 10' - phenothiazine)propyl]piperidine-4-(N,N-dimethyl)carboxamide.

To a stirred and refluxing suspension of 5.75 parts of 4-(N,N-dimethyl)piperidinecarboxamide, 1 part of sodium iodide, and 4.2 parts of potassium carbonate in 40 parts of butanone there are added in the course of 30 minutes 9.3 parts of 2-chloro-10-(γ-chloropropyl)phenothiazine in 40 parts of butanone. Stirring and refluxing are continued for 12 hours after which the mixture is cooled and filtered. The filtrate is concentrated under vacuum to give a residue.

This base is dissolved in a small amount of 2-propanol and treated with a 25% solution of hydrogen chloride in 2-propanol. Upon treatment of this solution with anhydrous ether, there is thus obtained the hydrochloride of 1 - [γ - (2' - chloro - 10' - phenothiazine)propyl]piperidine-4-(N,N-dimethyl)carboxamide, melting at about 200–203° C.

*Example 11*

To a stirred and refluxing suspension of 6.6 parts of 4-(N,N-diethyl)piperidinecarboxamide, 1 part of sodium iodide, and 4.2 parts of potassium carbonate in 40 parts of butanone, there are added in the course of 30 minutes, 9.3 parts of 2-chloro-10-(γ-chloropropyl)phenothiazine in 40 parts of butanone. The 4-(N,N-diethyl)piperidinecarboxamide is prepared according to the method outlined in Example 10. Stirring and refluxing are continued for 12 hours after which the mixture is cooled and filtered. The filtrate is concentrated under vacuum to give a residue which is recrystallized from a mixture of 2-propanol and petroleum ether.

This base is dissolved in a small amount of 2-propanol and treated with a 25% solution of hydrogen chloride in 2-propanol. Upon treatment of this solution with anhydrous ether there is thus obtained the hydrochloride of 1 - [γ - (2' - chloro - 10' - phenothiazine)propyl]piperidine-4-(N,N-diethyl)carboxamide.

*Example 12*

To a stirred and refluxing solution of 6.2 parts of 4-(N-isopropyl)piperidinecarboxamide hydrochloride, 1 part of sodium iodide and 8.4 parts of potassium carbonate in 40 parts of butanone there are added in the course of 30 minutes 9.3 parts of 2-chloro-10-(γ-chloropropyl)phenothiazine in 40 parts of butanone. Stirring and refluxing are continued for 12 hours after which the mixture is cooled and filtered. The filtrate is concentrated under vacuum and dissolved in 2-propanol. This solution is diluted with petroleum ether, azeotropically distilled to remove the alcohol, and evaporated to dryness. The base darkens from 150° C.–160° C. and melts at about 164° C.–165° C.

This base is dissolved in a small amount of 2-propanol and treated with a 25% solution of hydrogen chloride in 2-propanol. Upon treatment of this solution with anhydrous ether there is obtained the hydrochloride of 1 - [γ - (2'- chloro - 10' - phenothiazine)propyl]piperidine-4-(N-isopropyl)carboxamide.

*Example 13*

To a stirred and refluxing suspension of 6.2 parts of 4-(N-propyl)piperidinecarboxamide hydrochloride, 1 part of sodium iodide and 8.4 parts of potassium carbonate in 40 parts of ethanol there are added in the course of one half hour a solution of 8 parts of 2-chloro-10-(β-chloroethyl)phenothiazine in 40 parts of butanone. The 4-(N-propyl)piperidine carboxamide is prepared by methods analogous to the preparation of 4-(N-isopropyl)piperidinecarboxamide. Stirring and refluxing are continued for 12 hours after which the mixture is cooled and filtered. The filtrate is concentrated under vacuum and the residue is taken up in benzene and sodium carbonate. The benzene solution is washed to neutrality with water, filtered throught potassium carbonate, treated with hydrochloric acid in 2-propanol, and diluted with ether. The precipitated hydrochloride is collected on a filter, washed with ether, and dissolved in water. This solution is rendered alkaline by addition of 5% sodium carbonate solution and extracted with benzene. the benzene solution is washed to neutrality, filtered through potassium carbonate and evaporated to yield 1-[β-(2'-chloro-10'-phenothiazine)ethyl]piperidine-4-(N-propyl)carboxamide.

*Examples 14*

To a stirred and refluxing suspension of 7.55 parts of 4-[N,N-bis(β-dihydroxyethyl)]piperidinecarboxamide hydrochloride, 1 part of sodium iodide and 8.4 parts of potassium carbonate in 40 parts of ethanol there is added in the course of 30 minutes a solution of 9.3 parts of 2-chloro-10-(γ-chloropropyl)phenothiazine in 40 parts of butanone. Stirring and refluxing are continued for 12 hours after which the mixture is cooled and filtered. The filtrate is concentrated under vacuum to give a residue which is recrystallized from a mixture of 2-propanol and petroleum ether.

This base is dissolved in a small amount of 2-propanol and treated with a 25% solution of hydrogen chloride in 2-propanol. Upon treatment of this solution with anhydrous ether there is obtained the hydrochloride of 1-[γ-(2' - chloro - 10' - phenothiazine)propyl]piperidine - 4 - [N,N-bis(β-dihydroxyethyl)]carboxamide. The 1-[γ-(2'-chloro - 10' - phenothiazine)propyl]piperidine - 4 - [N,N - bis(γ-dihydroxypropyl)]carboxamide is made according to the procedure outlined above.

Example 15

To a stirred and refluxing suspension of 6.1 parts of 4-(N-allyl)piperidinecarboxamide hydrochloride, 1 part of sodium iodide and 8.4 parts of potassium carbonate in 40 parts of ethanol there is added in the course of 30 minutes a solution of 9.3 parts of 2-chloro-10-(γ-chloropropyl)phenothiazine in 40 parts of butanone. Stirring and refluxing are continued for 12 hours after which the mixture is cooled and filtered. The filtrate is concentrated under vacuum and the residue is taken up with benzene and sodium carbonate. The benzene solution is washed to neutrality with water, filtered through potassium carbonate, treated with hydrochloric acid and 2-propanol, and diluted with ether. The precipitated hydrochloride is collected on a filter, washed with ether, and dissolved in water. This solution is rendered alkaline by an addition of 5% sodium carbonate solution and extracted with benzene. The benzene solution is washed to neutrality, filtered through potassium carbonate, evaporated to yield 1-[γ-(2'-chloro-10'-phenothiazine)propyl]-piperidine-4-(N-allyl)carboxamide.

Example 16

To a stirred and refluxing suspension of 6.55 parts of 4-(N-methallyl)piperidinecarboxamide hydrochloride, 1 part of sodium iodide, and 8.4 parts of potassium carbonate in 40 parts of butanone there are added in the course of 30 minutes 9.3 parts of 2-chloro-10-(γ-chloropropyl)phenothiazine in 40 parts of butanone. The 4-(N-methallyl)piperidinecarboxamide is prepared by methods analogous to the preparation of 4-(N-allyl)piperidinecarboxamide. Stirring and refluxing are continued for 12 hours after which the mixture is cooled and filtered. The filtrate is concentrated under vacuum and the residue is taken up in benzene and sodium carbonate. The benzene solution is washed to neutrality with water, filtered through potassium carbonate, treated with hydrochloric acid in 2-propanol, and diluted with ether. The precipitated hydrochloride is collected on a filter, washed with ether, and dissolved in water. This solution is rendered alkaline by addition of a 5% sodium carbonate solution and extracted with benzene. The benzene solution is washed to neutrality, filtered through potassium carbonate, and evaporated to yield 1-[γ-(2'-chloro-10'-phenothiazine)propyl]piperidine - 4 - (N - methallyl)carboxamide. This base is dissolved in a small amount of 2-propanol and treated with a 25% solution of hydrogen chloride in 2-propanol. Upon treatment of this solution with anhydrous ether there is obtained the hydrochloride of 1-[γ-(2'-chloro-10'-phenothiazine)propyl]piperidine-4-(N-methallyl) carboxamide.

Example 17

To a stirred and refluxing suspension of 7.4 parts of 4-(N,N-diallyl)piperidinecarboxamide hydrochloride, 1 part of sodium iodide and 8.4 parts of potassium carbonate in 40 parts of butanone there are added in the course of 30 minutes 9.3 parts of 2-chloro-10-(γ-chloropropyl) phenothiazine in 40 parts of butanone. Stirring and refluxing are continued for 12 hours after which the mixture is cooled and filtered. The filtrate is concentrated under vacuum and the residue is taken up in benzene and sodium carbonate. The benzene solution is washed to neutrality with water, filtered through potassium carbonate, treated with hydrochloric acid in 2-propanol, and diluted with ether. The precipitated hydrochloride is collected on a filter, washed with ether, and dissolved in water. This solution is rendered alkaline by addition of a 5% sodium carbonate solution and extracted with benzene. The benzene solution is washed to neutrality, filtered through potassium carbonate, and evaporated to yield 1 - [γ - (2' - chloro - 10' - phenothiazine)propyl]-piperidine-4-(N,N-diallyl)carboxamide.

This base is dissolved in a small amount of 2-propanol and treated with a 25% solution of hydrogen chloride in 2-propanol. Upon treatment of this solution with anhydrous ether there is thus obtained the hydrochloride of 1 - [γ - (2' - chloro - 10' - phenothiazine)propyl] piperidine - 4 - (N,N - diallyl)carboxamide. The 1 - [γ-(2' - chloro - 10' - phenothiazine)propyl]piperidine - 4-(N,N-dimethallyl)carboxamide is made according to the procedure outlined above.

What is claimed is:

1. A piperidinecarboxamide of the structural formula

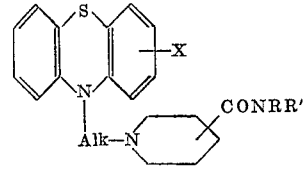

wherein Alk is a lower alkylene radical, X is a member of the class consisting of hydrogen and halogen, and NRR' is a member of the class consisting of the amino radical, lower alkyl amino radicals, lower alkenyl amino radicals, lower hydroxyalkyl amino radicals, lower dialkylamino radicals, and lower dialkenylamino radicals.

2. A piperidinecarboxamide of the structural formula

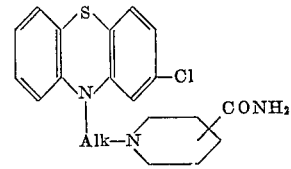

wherein Alk is a lower alkylene radical.

3. 1 - [γ - (2' - chloro - 10' - phenothiazine)propyl]piperidine-4-carboxamide.

4. 1 - [γ - (2' - chloro - 10' - phenothiazine)propyl]piperidine-3-carboxamide.

5. 1 - [γ - (2' - chloro - 10' - phenothiazine)propyl]piperidine-2-carboxamide.

6. A piperidinecarboxamide of the structural formula

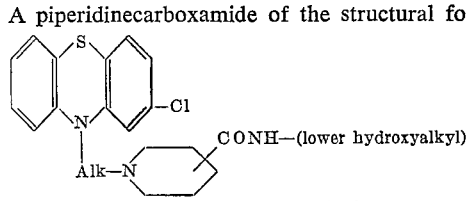

wherein Alk is a lower alkylene radical.

7. 1 - [γ - (2' - chloro - 10' - phenothiazine)propyl]piperidine-4-(β-hydroxyethyl)carboxamide.

8. A piperidinecarboxamide of the structural formula

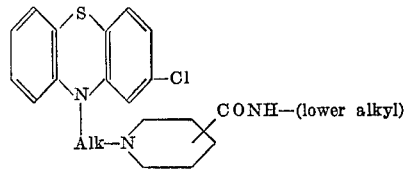

wherein Alk is a lower alkylene radical.

9. 1 - [γ - (2' - chloro - 10' - phenothiazine)propyl]piperidine-4-(N-methyl)carboxamide.

10. 1 - [γ - (2' - chloro - 10' - phenothiazine)propyl] piperidine-4-(N-isopropyl)carboxamide.

11. A piperidinecarboxamide of the structural formula

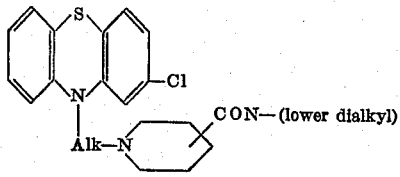

wherein Alk is a lower alkylene radical.

12. 1 - [γ - (2' - chloro - 10' - phenothiazine)propyl] piperidine-4-(N,N-dimethyl)carboxamide.

13. A piperidinecarboxamide of the structural formula

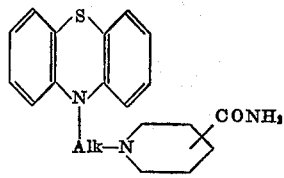

wherein Alk is a lower alkylene radical.

No references cited.